V. H. DONNELLY, H. B. KOESSLER & J. T. WEINZIERL.
TRIPLE AUXILIARY AIR VALVE FOR CARBURETERS.
APPLICATION FILED DEC. 13, 1909.
977,377.
Patented Nov. 29, 1910.
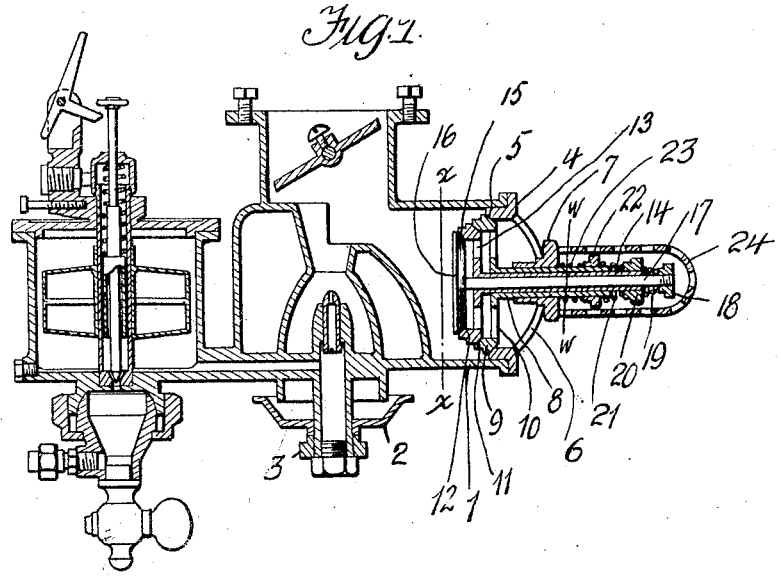
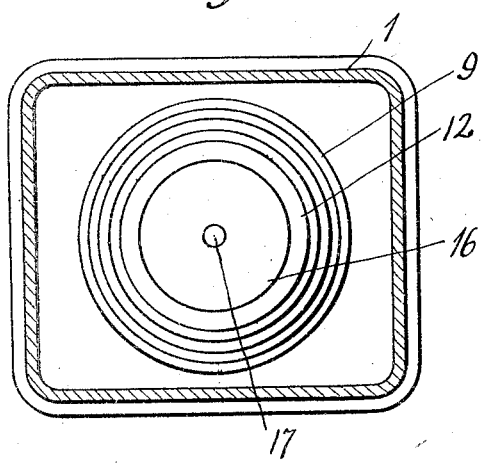
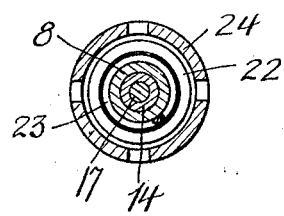
Witnesses:
Samuel Payne
R. H. Butler
Inventors
V. H. Donnelly,
H. B. Koessler and
J. T. Weinzierl.
by
Attorneys

UNITED STATES PATENT OFFICE.

VINCENT H. DONNELLY, HARRY B. KOESSLER, AND JOSEPH T. WEINZIERL, OF NEW KENSINGTON, PENNSYLVANIA.

TRIPLE AUXILIARY AIR-VALVE FOR CARBURETERS.

977,377.

Specification of Letters Patent. Patented Nov. 29, 1910.

Application filed December 13, 1909. Serial No. 532,923.

*To all whom it may concern:*

Be it known that we, VINCENT H. DONNELLY, HARRY B. KOESSLER, and JOSEPH T. WEINZIERL, citizens of the United States of America, residing at New Kensington, in the county of Westmoreland and State of Pennsylvania, have invented certain new and useful Improvements in Triple Auxiliary Air-Valves for Carbureters, of which the following is a specification, reference being had therein to the accompanying drawing.

This invention relates to triple action auxiliary air valves particularly designed for carbureters used in connection with automobiles.

The object of our invention is to provide a triple action auxiliary air valve for controlling the admission of air to a carbureter, and to provide novel means in connection with a valve whereby it can be regulated for use in connection with various types of motors.

Another object of the invention is to provide an air inlet valve for carbureters with three controlling mediums adapted to operate independently of one another or in unison.

A further object of the invention is to provide a valve of the above type that will be simple in construction, durable, inexpensive to manufacture, and highly efficient for the purposes for which it is intended.

With these and such other objects in view as may hereinafter appear, the invention consists of the novel construction, combination and arrangements of parts to be hereinafter specifically described and then claimed.

Reference will now be had to the drawing forming a part of this specification, wherein:—

Figure 1 is a vertical sectional view of a carbureter provided with our improved valve. Fig. 2 is an enlarged cross sectional view of the same taken on the line *x—x* of Fig. 1, and Fig. 3 is an enlarged cross sectional view taken on the line *w—w* of Fig. 1.

In the drawings, the reference numeral 1 denotes a carbureter casing having an adjustable cup 2 adapted to be regulated to control the ordinary supply of air to the carbureter, this cup being fixed by a lock nut 3 after the proper mixture has been obtained.

Our auxiliary triple valve is mounted upon the end of the casing 1, and comprises a cap or spider 4 having the inner end thereof provided with an annular valve seat 5. The cap or spider has suitable openings 6 and a central hub 7.

Slidably mounted in the hub 7 is a tubular stem 8 of a valve head 9 adapted to engage the seat 5, said valve head having openings 10 formed therein. The outer end of the valve head is provided with an annular valve seat 11 for a valve head 12, said head having openings 13 formed therein and supporting a tubular stem 14, which is adapted to slide in the tubular stem 8. The valve head 12 is provided with an annular valve seat 15 for a valve head 16, said head having a solid stem 17 adapted to extend through the tubular stem 14. The solid stem 17 is of a greater length than the stem 14, and the said stem 14 of a greater length than the stem 8. Upon the end of the solid stem 17 is adjustably mounted a nut 18 and encircling said stem between the end of the tubular stem 14 and said nut is a coiled spring 19. Upon the end of the tubular stem 14 is adjustably mounted a nut 20 and encircling the tubular stem 14 and the end of the tubular stem 8 is a coiled spring 21, said spring having one end thereof bearing against the nut 20, while the opposite end engages a nut 22 adjustably mounted upon the stem 8. Encircling the stem 8 between the nut 22 and the hub 7 is a coiled spring 23.

Mounted over the nuts 18, 20 and 22 and the outer ends of the stems 17, 14 and 8 is a perforated hub 24. The valve heads 9, 12 and 16 constitute auxiliary air control valves and these valves form an important part of the carbureter. At a low speed of a motor the valve 16 will independently control the mixture until a certain number of revolutions of the motor has been obtained, then the valve head 12 will operate in unison with the valve 16, and when a high speed has been obtained the valve head 9 operates in unison with the valve heads 9 and 12. The operation of the valves can be controlled to a nicety by adjusting the tension of the springs 19, 21 and 23, the tension of said springs being obtained through the medium of the nuts 18, 20 and 22. The successive operation of the valves depends on the relative strengths of the springs.

While in the drawings there is illustrated what we believe to be a practical embodiment of our invention, still we reserve the right to make various changes in the details of construction without departing from the spirit of the invention.

Having now described our invention what we claim as new is:—

1. In a carbureter, the combination with a carbureter casing, of an auxiliary air valve mechanism carried thereby, said mechanism comprising a spider carried by said casing, a valve slidably mounted in said spider and adapted to seat thereon, a valve slidably mounted in the last mentioned valve and adapted to seat thereon, a valve slidably mounted in the last mentioned valve and adapted to seat thereon, and adjustable means supported by said valves and for maintaining said valves in their seats.

2. The combination with a carbureter casing, of an auxiliary air valve mechanism carried thereby, said mechanism comprising a spider, a plurality of slidable valves supported by said spider and adapted to coöperate in closing said spider, and adjustable springs supported by said valves for normally maintaining said valves in their seats.

3. In a carbureter, an auxiliary air valve mechanism, said mechanism comprising a spider, an apertured valve head adapted to seat upon said spider, an apertured valve head adapted to seat upon the first mentioned valve, a valve head adapted to seat upon the last mentioned apertured valve head, valve stems carried by said valve heads and slidably arranged one within the other, and means carried by each of the valve stems for normally maintaining its respective valves seated.

4. In a carbureter, an auxiliary air inlet valve mechanism, said mechanism comprising a spider and tubular valve stem slidably mounted in said spider, an apertured valve head carried by said stem and adapted to seat upon said spider, a tubular valve stem slidably mounted in the first mentioned stem, an apertured valve head carried by said stem and adapted to seat upon the first mentioned head, a valve adapted to seat upon the last mentioned head, a solid valve stem carried by said valve and adapted to extend through the last mentioned tubular stem, and adjustable means carried by the end of each stem for normally holding its respective valve seated.

5. An auxiliary air valve mechanism for carbureters comprising a supporting member, opening into the carbureter, a plurality of slidable valves supported by said member and coöperating to close the latter, and an adjustable resilient pressure exerting means for and supported by each of said valves and normally maintaining its respective valve seated.

6. An auxiliary air valve mechanism for carbureters comprising a supporting member adapted to communicate with the carbureter, a plurality of slidable valves each provided with a valve stem and coöperating with each other to close said member, and an adjustable resilient pressure exerting device carried by each of the valve stems for normally maintaining its respective valve seated.

In testimony whereof we affix our signatures in the presence of two witnesses.

VINCENT H. DONNELLY.
HARRY B. KOESSLER.
JOSEPH T. WEINZIERL.

Witnesses:
VINCENT DEL VENTRIS,
REYNOLDS LAUGHLIN.